FIP8307 OR AI 119
Measuring valve.
(2)
R. M. Wade,
Lubricator.
No. 119. A.I. Patented Mar. 27, 1855.
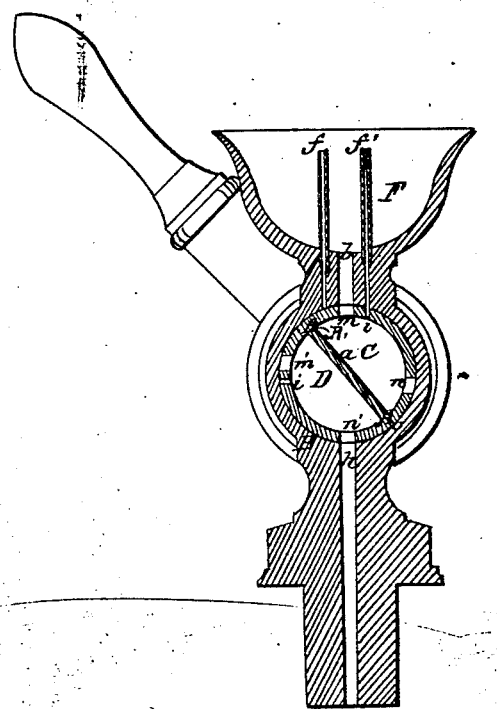
A.M. PHOTO-LITHO. CO. N.Y. (SOMERS'S PROCESS)